Patented June 6, 1939

2,161,319

UNITED STATES PATENT OFFICE 2,161,319

WELL-COVERING COATING COMPOSITION

Friedrich Schamberger, Ludwigshafen-on-the-Rhine, Germany, assignor to I. G. Farbenindustrie Aktiengesellschaft, Frankfort-on-the-Main, Germany No Drawing. Application April 28, 1936, Serial No. 76,769. In Germany April 29, 1935

9 Claims. (Cl. 134—46)

The present invention relates to well-covering coating masses intended for the protective coating of articles having non-absorbent surfaces and is therefore applicable to all metals, porcelain, glass and the like.

According to this invention a coating composition is obtained by the union of acids of phosphorus or of a mixture of the same in aqueous solution with one or more pigment-like oxides, which set and harden with the phosphoric acid, to produce a mass of a consistency similar to oil paints. The coating composition according to this invention is applied like an oil paint. The hardening of the coating may be accelerated by heating. The time of hardening may also be shortened, for example to about 10 minutes, by the addition of suitable substances.

For the said purpose, silicates are especially suitable, as for example silicates of aluminium, magnesium, calcium, zinc, zirconium and iron. Basic silicates are especially suitable. The silicates may be partly replaced, for example to the extent of one-half, by fluorides, as such or in the form of silicofluorides. Instead of chemically defined silicates, there may also be used substances which are mixtures of silicates with other substances, as for example natural pyrolusite, zirconite or titanite. The addition of these silicates or the like effects a rapid hardening and thorough drying of the mass when applied without the use of heat being necessary. The use of magnesium silicates as additions renders possible the preparation of quite thick coating layers up to a centimetre in thickness, these layers, however, adhere firmly and do not crack off.

When, especially for coating large articles, it is desired to retard the hardening in order to obtain a uniform covering, glycerine-phosphoric acid may be incorporated with the mass, provided the coating composition is not to be exposed to red heat after application. In such cases organic solvents miscible with water or soluble in water may be added, as for example glycol monoethyl ether or glycol monobutyl ether, which prevent the formation of bubbles in the coating. On the other hand when a very rapid hardening and drying of the coating is desired, a small amount of ethyl alcohol may be added to the mass.

In many cases, especially when applying coatings to metallic substrata, it is preferable to add to the coating composition chromium compounds, such as chromic acid, bichromates or chromates, preferably chromates of the alkali metals. These additional substances counteract any undesirable attack on the metallic substrata by the phosphoric acid.

The coating compositions according to this invention may also be provided with further additions of salts which increase the hardness of the coating or promote adherence, such as phosphates, borates, tungstates and manganates. In some cases it is preferable to add, in addition to phosphates, a salt of a readily volatile organic acid, as for example calcium acetate; the effect of the phosphates is thereby enhanced.

The coating compositions according to this invention may also be used by first preparing a priming coating which lacks one or more of the substances forming the finished coating composition, as for example the silicates, another composition then being applied which consists either of the lacking components alone, as for example the silicates, or which contains the lacking components together with the other components of the coating.

A coating composition may also be prepared which is intended only for the temporary protection of substrata, for example for the side of sheet metal which is not to be tinned in the case of tinning sheet metal on one side only. For such uses it is advantageous to add to the coating composition a loosening agent, as for example oxalic acid, which renders the coating readily removable.

Coating compositions according to this invention which have been prepared without such additional substances as decompose at high temperatures, such as glycerine phosphoric acid, withstand temperatures up to red heat without scaling off. They may be used for coating furnaces, hearths, firing doors, casting mould chests, glass cooling chests, exhausts, chimneys, copper boilers or the like in order to protect them from firing gases or other influences. Volatile organic substances, such as ethyl glycol, may also be incorporated with the heat-stable coating compositions. Such coating masses are stable even when the flame acts directly on the coating, even in the form of a fine pointed flame.

The coating compositions are frequently also stable to the action of aggressive solutions, gases and vapors, especially when in addition to the pigments they contain non-covering bodies such as kaolin, asbestos, glass powder, kieselguhr or carborundum.

As pigment may be employed, according to the desired color and the other requirements placed on the coating composition, an oxidic compound of an element selected from the group consisting of the first columns of the fourth, sixth and seventh group and of the iron group of the periodic system. For example chromium oxide ($Cr_2O_3$), manganese dioxide ($MnO_2$), titanium dioxide ($TiO_2$) and zirconium oxide ($XrO_2$) may be mentioned, the viscosity of such coating agents may be influenced by the total or partial replacement of the oxides by hydroxides and by the employment of tungsten oxide, molybdenum oxide, cobalt oxide or uranium oxide in addition to the said other pigments.

Since the coatings after hardening are insoluble in water and organic solvents, they may be overpainted with lacquers, such as cellulose derivative lacquers, with oil colors or with chlororubber in cases when stability to high temperatures is not necessary. Among uses in which stability to heat is of no importance may be mentioned protection against sea-water and atmospheric influences. It has been found that the coating compositions according to this invention are superior to the coating compositions already known for these purposes.

The following examples will further illustrate how the said invention may be carried out in practice but the invention is not restricted to these examples.

Example 1

A coating composition which is to be stable to red heat is composed as follows:

For a pale green color:

| | | |
|---|---|---|
| Titanium dioxide | kilograms | 12 |
| Chromium oxide | do | 3 |
| Aqueous ortho-phosphoric acid having a specific gravity of 1.3 | litres | 12 |
| Glycol monobutyl ether | kilogram | 0.8 |
| Water | litre | 0.8 |

For a white color:

| | | |
|---|---|---|
| Titanium dioxide | kilograms | 7.5 |
| Zirconium dioxide | do | 7.5 |
| Chromic acid anhydride | do | 0.1 |
| Aqueous ortho-phosphoric acid having a specific gravity of 1.3 | litres | 12.5 |
| Water | do | 1.5 |

Such compositions harden superficially in about one hour. For hardening until the coating is insoluble in water, a period of three days at room temperature is required. By heating to about 80° C., the hardening may be effected in 15 minutes. The heating may, however, be omitted because this takes place in any case the first time the articles are heated.

Example 2

A white coating composition which dries in the air and which is suitable for zinc sheet is prepared by mixing the following substances:

| | | |
|---|---|---|
| Zirconium dioxide | kilograms | 5 |
| Zirconium silicate | do | 10 |
| Aqueous meta-phosphoric acid having a specific gravity of 1.3 | litres | 8 |
| Aqueous ortho-phosphoric acid having a specific gravity of 1.3 | litres | 4 |
| Potassium bichromate dissolved in 200 grams of water | grams | 80 |
| Aqueous ortho-phosphoric acid having a specific gravity of 1.3 | grams | 200 |

Example 3

A pale grey priming paint which dries in the air is composed as follows:

| | | |
|---|---|---|
| Zirconium dioxide | kilograms | 10 |
| Natural pyrolusite containing 90 per cent of $MnO_2$ | kilograms | 5 |
| Aqueous ortho-phosphoric acid having a specific gravity of 1.3 | litres | 9 |
| Aqueous meta-phosphoric acid having a specific gravity of 1.3 | litres | 3 |
| Glycerine phosphoric acid | kilogram | 0.5 |
| Chromic acid anhydride | grams | 50 |
| Water | litre | 0.5 |

Example 4

A white priming paint which dries in the air is of the following composition:

| | | |
|---|---|---|
| Titanium dioxide | kilograms | 10 |
| Kaolin | do | 5 |
| Aqueous-ortho-phosphoric acid and having a specific gravity of 1.3 | litres | 10 |
| Aqueous meta-phosphoric acid having a specific gravity of 1.3 | litres | 2 |
| Water | do | 1 |

Example 5

A coating composition which hardens by heating to 40° C. and which is intended for use at ordinary temperature has the following composition:

| | | |
|---|---|---|
| Chromium oxide | kilograms | 9 |
| Calcium silicate | do | 2 |
| Magnesium silicate | do | 1 |
| Kaolin | do | 3 |
| Aqueous ortho-phosphoric acid having a specific gravity of 1.3 | litres | 13 |
| Chromic acid anhydride | kilogram | 0.12 |

Example 6

A coating which is readily removable after use and which may be used for example as a protective coating on one side of iron sheet when tinning the same on one side only has the following composition:

| | | |
|---|---|---|
| Titanium dioxide | kilograms | 10 |
| Natural pyrolusite containing 90 per cent of $MnO_2$ | kilograms | 5 |
| Chromic acid anhydride | do | 0.1 |
| Oxalic acid | do | 0.5 |
| Aqueous ortho-phosphoric acid having a specific gravity of 1.3 | litres | 12 |
| Water for dilution according to desire. | | |

What I claim is:

1. A coating composition of the consistency of an oil paint, comprising about equal quantities by weight of an aqueous solution of a phosphoric acid having a specific gravity of about 1.3 as a binder and a pigment-like oxidic compound, which sets and hardens with the phosphoric acid.

2. A coating composition of the consistency of an oil paint, comprising about equal quantities by weight of an aqueous solution of a phosphoric acid having a specific gravity of about 1.3 as a binder and an oxidic compound of an element selected from the group consisting of the first columns of the fourth, sixth and seventh group and of the iron group of the periodic system.

3. As coating composition of the consistency of an oil paint, comprising about equal quantities by weight of an aqueous solution of a phosphoric acid having a specific gravity of about 1.3 as a binder and an oxidic compound of an element selected from the group consisting of the first columns of the fourth, sixth and seventh group and of the iron group of the periodic system, which composition contains an addition of a hardening salt.

4. A coating composition of the consistency of an oil paint, comprising about equal quantities by weight of an aqueous solution of a phosphoric acid having a specific gravity of about 1.3 as a binder and an oxidic compound of an element selected from the group consisting of the first columns of the fourth, sixth and seventh group and of the iron group of the periodic system, which composition contains a silicate and a fluoride.

5. A coating composition of the consistency of an oil paint, comprising about equal quantities by weight of an aqueous solution of a phosphoric acid having a specific gravity of about 1.3 as a binder and an oxidic compound of an element selected from the group consisting of the first columns of the fourth, sixth and seventh group and of the iron group of the periodic system, which composition contains a chromic acid compound in addition to at least one oxidic compound of the said kind.

6. A coating composition as claimed in claim 5, the chromic acid compound being chromic acid anhydride.

7. A coating composition as claimed in claim 5, the chromic acid compound being a chromate.

8. A coating composition of the consistency of an oil paint, comprising about equal quantities by weight of an aqueous solution of a phosphoric acid having a specific gravity of about 1.3 as a binder and an oxidic compound of an element selected from the group consisting of the first columns of the fourth, sixth and seventh group and of the iron group of the periodic system, which composition contains an addition of a glycolmonoalkylether.

9. A coating composition of the consistency of an oil paint, comprising about equal quantities by weight of an aqueous solution of a phosphoric acid having a specific gravity of about 1.3 as a binder and an oxidic compound of an element selected from the group consisting of the first columns of the fourth, sixth and seventh group and of the iron group of the periodic system, which composition contains glycerine-phosphoric acid.

FRIEDRICH SCHAMBERGER.